United States Patent
Kato et al.

(10) Patent No.: US 10,018,270 B2
(45) Date of Patent: Jul. 10, 2018

(54) INDUSTRIAL VEHICLE AND METHOD FOR CONTROLLING INDUSTRIAL VEHICLE

(71) Applicant: KABUSHIKI KAISHA TOYOTA JIDOSHOKKI, Kariya-shi, Aichi-ken (JP)

(72) Inventors: Norihiko Kato, Kariya (JP); Yukikazu Koide, Kariya (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 361 days.

(21) Appl. No.: 14/271,610

(22) Filed: May 7, 2014

(65) Prior Publication Data

US 2014/0331659 A1    Nov. 13, 2014

(30) Foreign Application Priority Data

May 13, 2013 (JP) .................. 2013-101199

(51) Int. Cl.
    *F15B 13/00* (2006.01)
    *F16H 61/475* (2010.01)
    *B66F 9/22* (2006.01)

(52) U.S. Cl.
    CPC ............. *F16H 61/475* (2013.01); *B66F 9/22* (2013.01); *F15B 2211/50536* (2013.01)

(58) Field of Classification Search
    CPC ........................................ F15B 2211/50536
    See application file for complete search history.

(56) References Cited

U.S. PATENT DOCUMENTS

| 6,282,890 B1 * | 9/2001 | Takano ................. E02F 9/2203 60/420 |
| 2008/0190703 A1 | 8/2008 | Kato et al. |

(Continued)

FOREIGN PATENT DOCUMENTS

| CN | 201962040 U | 9/2011 |
| DE | 10224731 A1 | 1/2003 |

(Continued)

OTHER PUBLICATIONS

Communication dated Nov. 24, 2015, issued by the State Intellectual Property Office of the P.R.C. in corresponding Chinese Application No. 201410195800.3.

(Continued)

*Primary Examiner* — F. Daniel Lopez
(74) *Attorney, Agent, or Firm* — Sughrue Mion, PLLC

(57) ABSTRACT

An industrial vehicle includes a hydraulic mechanism, an operation lever, and a pump, a hydraulic control valve unit, a lever operation detector, an internal combustion engine controller, and a valve controller that controls the hydraulic control valve unit. When the lever operation detector detects the operation of the operation lever under a situation in which a speed of the internal combustion engine is less than or equal to a predetermined speed, the valve controller operates the hydraulic control valve unit to discharge the hydraulic oil without supplying the hydraulic oil to the hydraulic mechanism and instructs the internal combustion engine controller to increase the speed of the internal combustion engine, and subsequently operates the hydraulic control valve unit to supply the hydraulic mechanism with the hydraulic oil.

5 Claims, 6 Drawing Sheets

(56) References Cited

U.S. PATENT DOCUMENTS

| | | |
|---|---|---|
| 2011/0112712 A1 | 5/2011 | Koide et al. |
| 2011/0118922 A1 | 5/2011 | Koide |
| 2012/0078486 A1 | 3/2012 | Welschof et al. |
| 2013/0013159 A1 | 1/2013 | Moriki et al. |
| 2013/0167521 A1 | 7/2013 | Tsuruta et al. |

FOREIGN PATENT DOCUMENTS

| | | |
|---|---|---|
| DE | 102010047628 A1 | 3/2012 |
| EP | 1736433 A1 | 12/2006 |
| EP | 2322398 A2 | 5/2011 |
| EP | 2322466 A2 | 5/2011 |
| EP | 2549642 A1 | 1/2013 |
| EP | 2617675 A1 | 7/2013 |
| JP | 11-351007 A | 12/1999 |
| JP | 2002012398 A | 1/2002 |
| JP | 2011105125 A | 6/2011 |
| JP | 2012-62137 A | 3/2012 |

OTHER PUBLICATIONS

Communication dated Aug. 27, 2014 from The European Patent Office in counterpart European Patent Application No. 14167293.1.
Communication dated Sep. 14, 2016, from the European Patent Office in counterpart European Application No. 14167293.1.
H.J. Mathies; "Einführung in die Ölhydraulik" Teubner Studienbucher, 1984; 7 pages total.

\* cited by examiner

INDUSTRIAL VEHICLE AND METHOD FOR CONTROLLING INDUSTRIAL VEHICLE

BACKGROUND OF THE INVENTION

The present invention relates to an industrial vehicle that includes a hydraulic mechanism and a method for controlling the industrial vehicle.

One example of an industrial vehicle including a hydraulic mechanism is an engine forklift used to lift and move materials. Such a forklift uses the hydraulic mechanism to lift and lower (lift operation) and tilt forward and rearward (tilt operation) forks located at the front of the forklift when handling materials. The hydraulic mechanism uses a hydraulic pump driven by the engine of the forklift when performing a lift operation and a tilt operation.

Regulations that restrict exhaust gas emissions have become strict and are also applied to industrial vehicles. This has resulted in a need to improve fuel efficiency. To do so, the speed and output of the engine may be reduced when the engine is idling and the forklift is not handling materials. When the engine is idling, the operation of the hydraulic mechanism to move the forks and handle a material produces a load that further reduces the speed and output of the engine. This may destabilize the engine behavior and cause knocking, deteriorate the exhaust gas components, or stall the engine.

Japanese Laid-Open Patent Publication No. 2012-62137 describes an example of a conventional hydraulic system for an industrial vehicle. The hydraulic system includes a material handling pump, which is driven by an engine and which discharges hydraulic oil, a material handling hydraulic actuator, and a control valve, which controls the supply of hydraulic oil to the hydraulic actuator. A hydraulic pipe connects the control valve to the pump. A discharge pipe, branched from the hydraulic pipe, is connected to a hydraulic oil tank. An unload valve is arranged in the discharge pipe to open and close the discharge pipe. In a normal material handling operation, the unload valve closes the discharge pipe. Thus, the hydraulic oil from the pump is sent to the control valve. When the engine speed is less than or equal to a predetermined speed or the pressure of the hydraulic oil in the hydraulic pipe is greater than or equal to a predetermined value, a controller, which controls the unload valve, determines that the engine may stall and thus operates the unload valve to open the discharge pipe. This reduces the load on the pump and prevents engine stalling.

Further, the '137 publication describes a pump load reduction system for the industrial vehicle. The system is arranged in the hydraulic pipe that connects the material handling pump and the control valve. The pump load reduction system includes a switch valve, which is arranged in the discharge pipe, a sub-relief valve, which is arranged in the discharge pipe at the downstream side of the switching valve, and a check valve, which is arranged in the hydraulic pipe at the downstream side of where the discharge pipe is branched. When the engine speed is high, the switch valve is controlled to send the hydraulic oil to the downstream control valve in the hydraulic pipe. When the engine speed is lower than the predetermined value, the switch valve is controlled to send the hydraulic oil to the discharge pipe. In the pump load reduction system, when the hydraulic pressure of the hydraulic oil in the pipes reaches the pressure that opens the sub-relief valve, the sub-relief valve opens and discharges the hydraulic oil through the discharge pipe. This keeps the hydraulic pressure in the pipe less than the pressure that opens the sub-relief valve. Accordingly, the pump load reduction system reduces the load on the pump and prevents engine stalling.

However, in the hydraulic system of the '137 publication, during a material handling operation, the opening of the unload valve and the switching of the switch valve is performed after detection of a decrease in the engine speed to the predetermined speed or less. Thus, when load is applied to the pump and the engine, the engine speed may be temporarily reduced to less than the predetermined speed. In this case, when the predetermined speed is set to the idling speed, the engine speed may become less than the idling speed. This may destabilize the engine behavior and cause knocking, deteriorate the exhaust gas components, or stall the engine.

Further, in the pump load reduction system of the '137 publication, load is also applied to the pump and the engine during a material handling operation. Thus, the engine speed may become less than the idling speed.

SUMMARY OF THE INVENTION

It is an object of the present disclosure to provide an industrial vehicle that limits reduction in the engine speed when a hydraulic mechanism is operated while the engine speed is low and a method for controlling an industrial vehicle.

To achieve the above object, one aspect of the present invention is an industrial vehicle driven by an internal combustion engine. The industrial vehicle includes a hydraulic mechanism, and an operation lever operated to operate the hydraulic mechanism. A pump is driven by the internal combustion engine to discharge hydraulic oil. A hydraulic control valve unit is supplied with the hydraulic oil from the pump and adapted to control the hydraulic oil supplied to the hydraulic mechanism based on the operation of the operation lever. A lever operation detector is adapted to detect the operation of the operation lever. An internal combustion engine controller is adapted to control the internal combustion engine. A valve controller is adapted to receive detection information from the lever operation detector and control the hydraulic control valve unit. The valve controller is adapted so that when the lever operation detector detects the operation of the operation lever under a situation in which a speed of the internal combustion engine is less than or equal to a predetermined speed, the valve controller operates the hydraulic control valve unit to discharge the hydraulic oil without supplying the hydraulic oil to the hydraulic mechanism and instructs the internal combustion engine controller to increase the speed of the internal combustion engine, and subsequently operates the hydraulic control valve unit to supply the hydraulic mechanism with the hydraulic oil.

Another aspect of the present invention is a method for controlling an industrial vehicle that is driven by an internal combustion engine and includes a hydraulic mechanism, an operation lever operated to operate the hydraulic mechanism, a pump driven by the internal combustion engine to discharge hydraulic oil, a hydraulic control valve unit supplied with the hydraulic oil from the pump and adapted to control the hydraulic oil supplied to the hydraulic mechanism based on the operation of the operation lever, a lever operation detector adapted to detect the operation of the operation lever, an internal combustion engine controller adapted to control the internal combustion engine, and a valve controller adapted to receive detection information from the lever operation detector and control the hydraulic control valve unit. The method includes, when the lever operation detector detects the operation of the operation lever under a situation in which a speed of the internal combustion engine is less than or equal to a predetermined speed, operating the hydraulic control valve unit to discharge the hydraulic oil without supplying the hydraulic oil to the hydraulic mechanism and instructing the internal combustion engine controller to increase the speed of the internal combustion engine, and after operating the hydraulic control valve unit and instructing the internal combustion engine controller, operating the hydraulic control valve unit to supply the hydraulic mechanism with the hydraulic oil.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

First Embodiment

Figure 1:
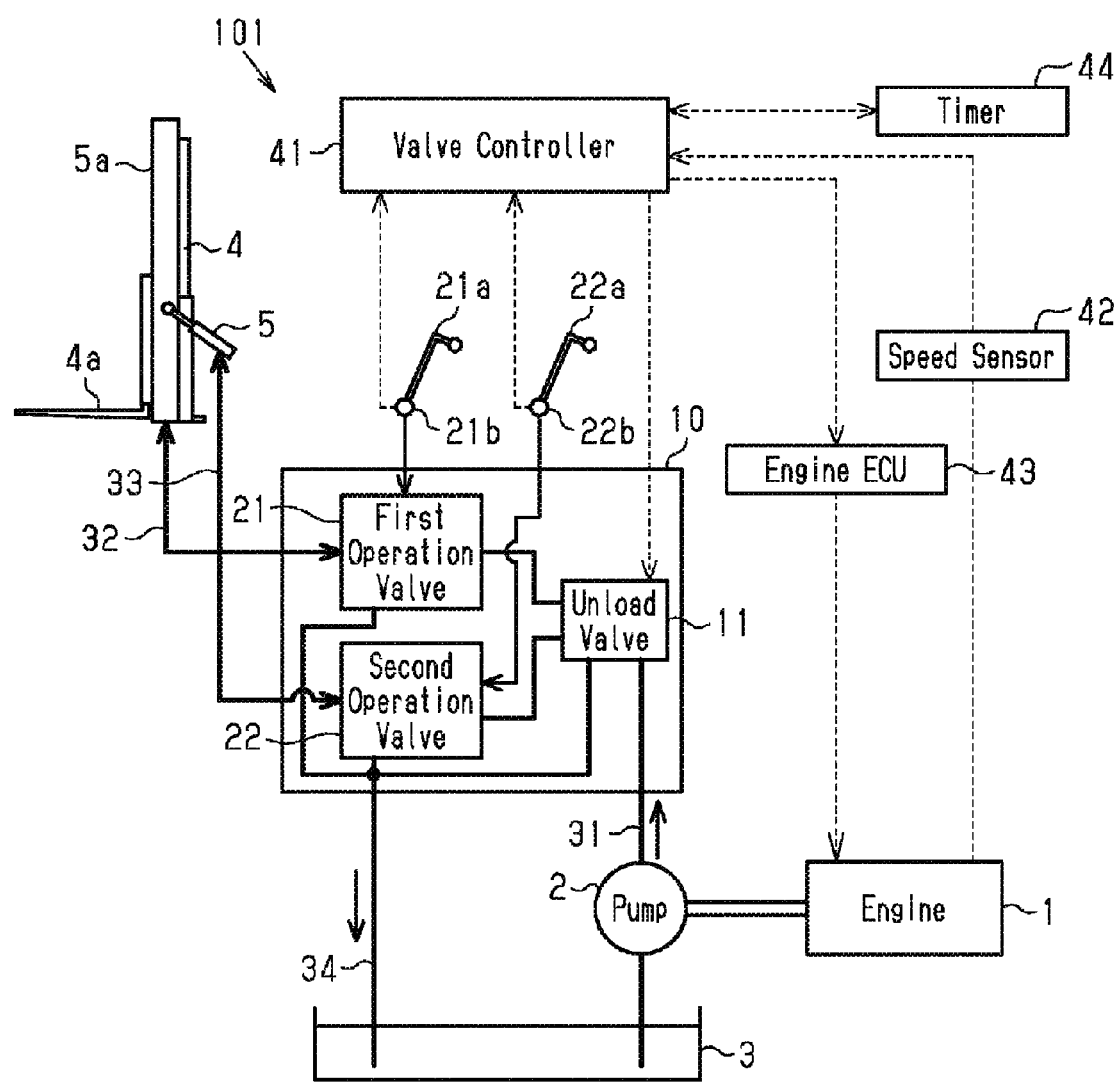
FIG. 1 is a schematic view showing the structure of a first embodiment of an industrial vehicle.

Referring to FIG. 1, an industrial vehicle 101 of a first embodiment of the present invention will now be described. In the present embodiment, the industrial vehicle 101 is a forklift.

The forklift 101 includes an engine 1, which is an internal combustion engine that functions as the driving source for driving the forklift 101 and handling materials. The forklift 101 also includes a hydraulic pump 2, which is coupled to and driven by the engine 1 to produce rotation in accordance with the rotation of the engine 1, and an oil tank 3, which stores hydraulic oil. The speed of the engine 1 is controlled based on the depression amount of an accelerator pedal (not shown). When driven by the engine 1, the hydraulic pump 2 draws in the hydraulic oil from the oil tank 3 and discharges the hydraulic oil under pressure. The hydraulic pump 2, which is driven by the engine 1, includes an input shaft coupled to the output shaft of the engine 1. Thus, the power of the engine 1 rotates the hydraulic pump 2. The speed of the hydraulic pump 2 increases and decreases in accordance with the speed of the engine 1. The discharge amount of the hydraulic oil is increased and decreased accordingly.

The forklift 101 further includes a lift cylinder 4, a fork 4a, which is lifted and lowered by the lift cylinder 4, a tilt cylinder 5, and a mast 5a. The tilt cylinder 5 tilts the fork 4a by tilting the mast 5a. The hydraulic pump 2 is connected to the cylinders 4 and 5 by a hydraulic control valve unit 10 and hydraulic pipes. The lift cylinder 4 and the tilt cylinder 5 form part of a hydraulic mechanism.

The hydraulic control valve unit 10 is supplied with hydraulic oil delivered from the hydraulic pump 2 through a hydraulic pipe 31. To control the flow of the hydraulic oil, the hydraulic control valve unit 10 includes an unload valve 11, a first operation valve 21, and a second operation valve 22.

The first operation valve 21 is in communication with the lift cylinder 4 through a hydraulic pipe 32. The first operation valve 21 is switched to control supply and discharge of hydraulic oil to and from the lift cylinder 4. The first operation valve 21 is also in communication with an oil returning pipe 34 to send the hydraulic oil returning from the lift cylinder 4 to the oil tank 3. The first operation valve 21 is switched to be in a supply state, a discharge state, or a stop state. In the supply state, the first operation valve 21 supplies the lift cylinder 4 with the hydraulic oil. The increased hydraulic pressure of the hydraulic oil extends the lift cylinder 4 and lifts the fork 4a. In the discharge state, the first operation valve 21 discharges hydraulic oil from the lift cylinder 4 into the oil tank 3. This contracts the lift cylinder 4 and lowers the fork 4a. The hydraulic pump 2 is not operated in the discharge state. In the stop state, the first operation valve 21 stops supply and discharge of hydraulic oil to and from the lift cylinder 4.

The first operation valve 21 is mechanically coupled to a lift operation lever 21a that extends from the hydraulic control valve unit 10 to the operator cab of the forklift 101. Operation of the lift operation lever 21a controls the supply and discharge of hydraulic oil through the first operation valve 21. The lift operation lever 21a includes a first operation detection sensor 21b that detects the operation state of the lift operation lever 21a and sends a detection signal to a valve controller 41, which is electrically connected to the first operation detection sensor 21b. When the lift operation lever 21a is in a neutral position, the first operation valve 21 is in the stop state. When the lift operation lever 21a is operated, the first operation valve 21 shifts to the supply state or the discharge state.

The second operation valve 22 is in communication with the tilt cylinder 5 through a hydraulic pipe 33. The second operation valve 22 is switched to control supply and discharge of hydraulic oil to and from the tilt cylinder 5. The second operation valve 22 is also in communication with the oil returning pipe 34 to send the hydraulic oil returning from the tilt cylinder 5 to the oil tank 3 through the oil returning pipe 34. The tilt cylinder 5 includes a bottom chamber and a rod chamber (not shown). When hydraulic oil is supplied to the bottom chamber and the hydraulic oil in the rod chamber is discharged, the tilt cylinder 5 extends to tilt the mast 5a forward. When the hydraulic oil in the bottom chamber is discharged and hydraulic oil is supplied to the rod chamber, the tilt cylinder 5 contracts to tilt the mast 5a rearward.

The second operation valve 22 is mechanically coupled to a tilt operation lever 22a that extends from the hydraulic control valve unit 10 to the operator cab of the forklift 101. Operation of the tilt operation lever 22a controls the supply and discharge of hydraulic oil through the second operation valve 22. The tilt operation lever 22a includes a second operation detection sensor 22b that detects the operation state of the tilt operation lever 22a and send a detection signal to the valve controller 41. When the tilt operation lever 22a is in a neutral position, the second operation valve 22 stops the supply and discharge of hydraulic oil. When the tilt operation lever 22a is operated, the second operation valve 22 supplies or discharges hydraulic oil to or from the tilt cylinder 5. The first and second operation detection sensors 21b and 22b form a lever operation detector.

The unload valve 11, which functions as a switch valve of the flow passage, is located closest to the hydraulic pump 2 among the valves of the hydraulic control valve unit 10. The upstream side of the unload valve 11 is in communication with the hydraulic pipe 31 extending from the hydraulic pump 2. The downstream side of the unload valve 11 is in communication with the first operation valve 21, the second operation valve 22, and the oil returning pipe 34. The unload valve 11 is switched so that the hydraulic oil received from the hydraulic pump 2 through the hydraulic pipe 31 is supplied to the first and second operation valves 22 or returned to the oil returning pipe 34. The unload valve 11 is electrically connected to the valve controller 41 to allow switching of the unload valve 11.

The valve controller 41 is electrically connected to a speed sensor 42, which detects the speed of the engine 1, and an engine ECU 43, which controls the operation of the engine 1. The valve controller 41 receives the speed of the engine 1 from the speed sensor 42 and sends instructions to the engine ECU to control the operation of the engine 1. The engine ECU 43 functions as an internal combustion engine controller.

Further, the valve controller 41 is electrically connected to a timer 44. The valve controller 41 starts and stops the timer 44 and receives the time measured by the timer 44.

To simplify the description, FIG. 1 does not show the hydraulic pipes and valves in detail.

The operation of the forklift 101 (industrial vehicle) of the first embodiment will now be described.

Figure 2:
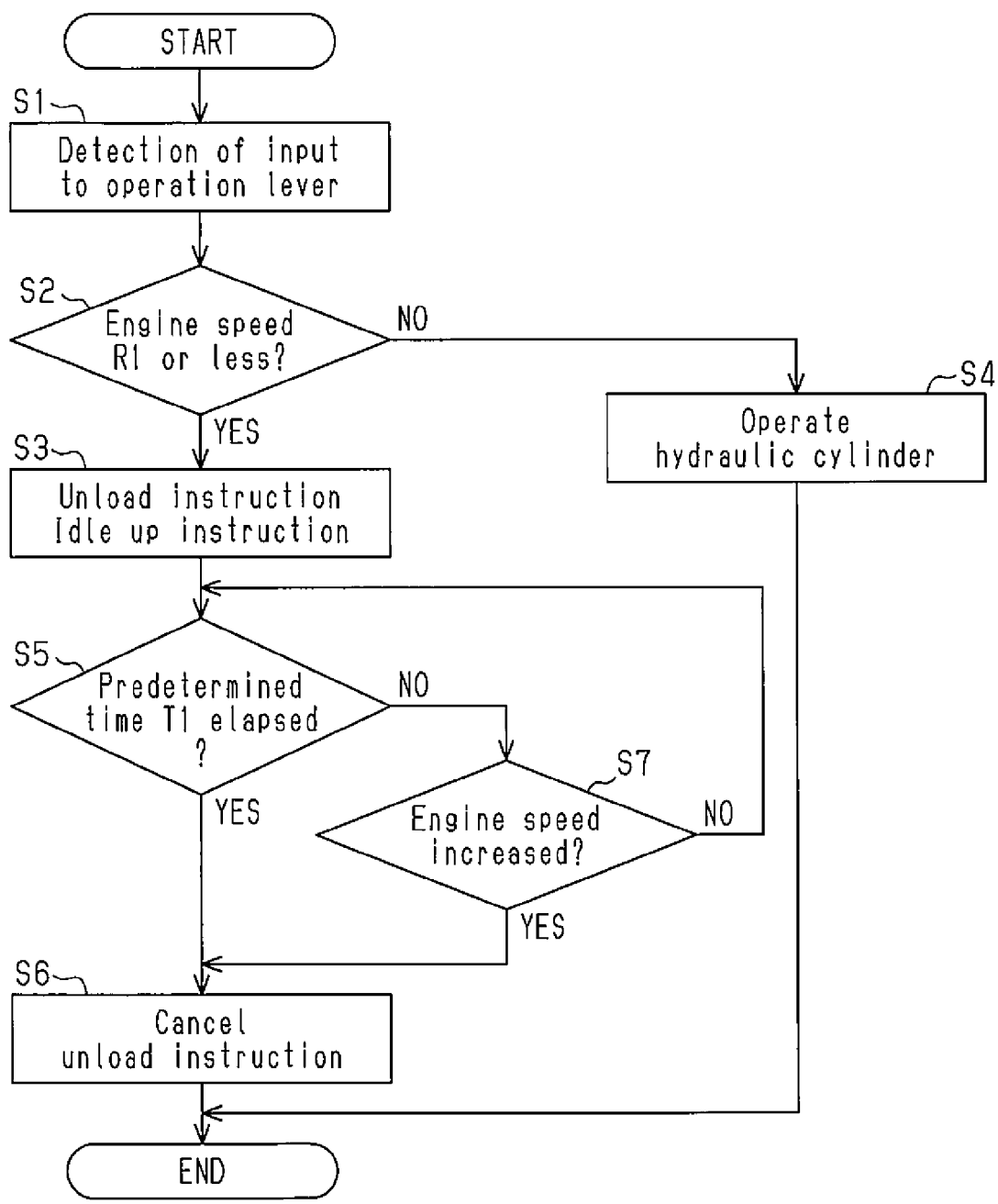
FIG. 2 is a flowchart of the operation of the industrial vehicle of FIG. 1.

In the forklift 101, the valve controller 41 performs control as shown in the flowchart of FIG. 2 when the operator operates the operation lever 21a or 22a while the speed of the engine 1 is a first predetermined speed R1 or less. The first predetermined speed R1 is a low speed. In the following embodiments, the first predetermined speed R1 is the engine speed when the accelerator pedal is not depressed and the engine is idling.

Normally, the valve controller 41 holds the unload valve 11 to communicate the hydraulic pump 2 and the operation valves 21 and 22.

Referring to FIGS. 1 and 2, in step S1, when the operator of the forklift 101 moves the lift operation lever 21a or the tilt operation lever 22a from the neutral position, the operation detection sensor 21b or 22b sends a detection signal to the valve controller 41 that indicates an input state of the lift operation lever 21a or the tilt operation lever 22a.

Then in step S2, the valve controller 41, which has received the detection signal, detects the speed of the engine 1 via the speed sensor 42. In addition, the valve controller 41 determines whether or not the engine speed is the first predetermined speed R1 or less. An example of the first predetermined speed R1 is 750 rpm, which is the idling speed. If the speed is the first predetermined speed R1 or less, the valve controller 41 proceeds to step S3. If the speed exceeds the first predetermined speed R1, the valve controller 41 proceeds to step S4.

In step S4, the valve controller 41 holds the unload valve 11 so that the hydraulic pump 2 is in communication with the operation valves 21 and 22 to operate a hydraulic cylinder based on the operation of the lift operation lever 21a or the tilt operation lever 22a. The first operation valve 21 or the second operation valve 22, to which hydraulic oil is supplied from the hydraulic pump 2, supplies the hydraulic oil to the lift cylinder 4 to extend the lift cylinder 4, or to the tilt cylinder 5 to extend or contract the tilt cylinder 5. Accordingly, the fork 4a is lifted or tilted.

In step S3, the valve controller 41 issues an unload instruction to the unload valve 11. This switches the unload valve 11 to an unload state in which the hydraulic pump 2 is in communication with the oil returning pipe 34. Thus, the hydraulic oil from the hydraulic pump 2 is not supplied to any of the operation valves 21 and 22 and returns to the oil tank 3. This significantly reduces the resistance to the hydraulic oil flow and the load on the hydraulic pump 2 and the engine 1 caused by the resistance. The unload valve 11 maintains the unload state until the valve controller 41 cancels the unload instruction.

At the same time as when the unload instruction is issued to the unload valve 11, the valve controller 41 instructs the engine ECU 43 to increase the engine speed to a second predetermined speed R2 (e.g., 900 rpm), which is higher than the first predetermined speed R1. In other words, the valve controller 41 issues an idle up instruction to the engine ECU 43. Accordingly, the engine ECU 43 performs control to increase the engine speed by increasing the amount of fuel supplied to the engine 1 or by increasing the throttle open degree, for example. The engine ECU 43 maintains the increased idling speed until the valve controller 41 cancels the idle up instruction.

At the same time as when the unload instruction is issued to the unload valve 11 and the idle up instruction is issued to the engine ECU 43, the valve controller 41 starts the timer 44 to measure the time elapsed since time T0, which is the start time of the timer 44. The valve controller 41 monitors the elapsed time measured by the timer 44 and the speed information of the engine 1 that is detected by the speed sensor 42.

Figure 3:
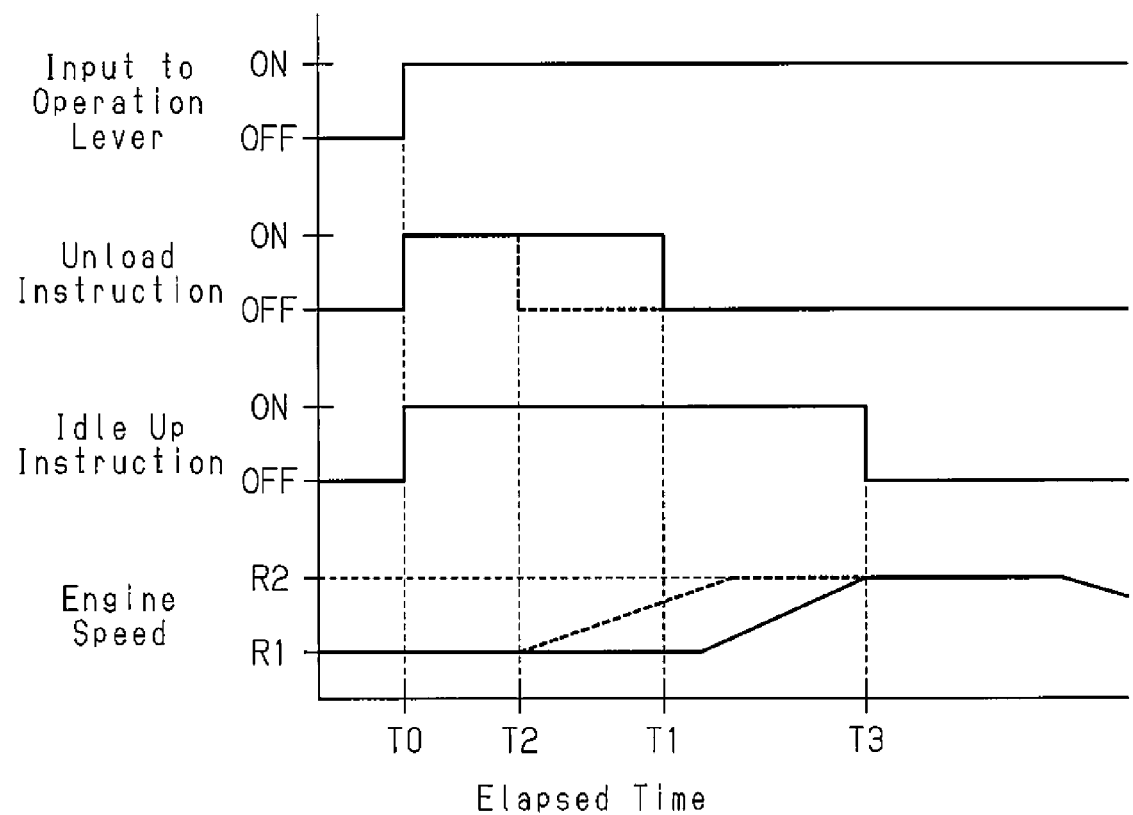
FIG. 3 is a time chart showing the operation of various portions when the flowchart of FIG. 2 is processed.

FIG. 3 shows the input status of the operation lever 21a or 22a from the time T0, the issue status of the unload instruction, the issue status of the idle up instruction, and the status of speed of the engine 1.

Referring also to FIG. 3, in step 5S that follows step S3, the valve controller 41 determines whether or not the elapsed time measured by the timer 44 has reached a predetermined time T1. If the valve controller 41 determines that the elapsed time has reached the predetermined time T1, the valve controller 41 proceeds to step S6. If the valve controller 41 determines that the elapsed time has not reached the predetermined time T1, the valve controller 41 proceeds to step S7.

In step S6, the valve controller 41 cancels the unload instruction to switch the unload valve 11 to communicate the hydraulic pump 2 and the operation valves 21 and 22. Consequently, the hydraulic oil flows through the operation valve 21 or 22 to be supplied to the lift cylinder 4 to extend the lift cylinder 4, or to be supplied to the tilt cylinder 5 to extend or contract the tilt cylinder 5. When cancelling the unload instruction, the valve controller 41 stops the timer 44.

In step S7, the valve controller 41 determines whether or not the speed of the engine 1 has increased. This is performed by determining whether or not the engine speed detected by the speed sensor 42 has exceeded a predetermined speed. The predetermined speed may be the first predetermined speed R1, for example. When the speed exceeds the first predetermined speed R1, in other words, when the speed exceeds the idling speed, the valve controller 41 determines that the engine speed has increased. If the speed is the first predetermined speed R1 or less, the valve controller 41 returns to step S5. If the speed exceeds the first predetermined speed R1, the valve controller 41 proceeds to step S6 and cancels the unload instruction as described above.

Normally, the speed of the engine 1 starts to increase with a short delay after starting the control for increasing the speed. However, if the valve controller 41 determines that the speed has increased and exceeds the first predetermined speed R1 at elapsed time T2, which is shorter than the predetermined time T1, the valve controller 41 proceeds to step S6 and cancels the unload instruction as indicated by the broken lines in FIG. 3.

As described above, when the engine speed is the first predetermined speed R1 or less and the valve controller 41 detects an input to the operation lever 21a or 22a that may apply load to the hydraulic pump 2, the valve controller 41 switches the unload valve 11 to the unload state and issues an instruction to idle up the engine 1, that is, increase the idling speed of the engine 1. Subsequently, when the condition that the predetermined time T1 has elapsed or the condition that the speed of the engine 1 is detected to be increased is satisfied, the valve controller 41 cancels the unload state of the unload valve 11. After canceling the unload state of the unload valve 11, the valve controller 41 may operate the engine ECU 43 to increase the speed until elapsed time T3 at which the speed reaches the second predetermined speed R2. Alternatively, the valve controller 41 may operate the engine ECU 43 to maintain the speed when cancelling the unload state or reduce the speed to the first predetermined speed R1.

The forklift 101 of the first embodiment includes the hydraulic pump 2, the hydraulic control valve unit 10, the operation detection sensors 21b and 22b, the engine ECU 43, and the valve controller 41. The hydraulic pump 2 is driven by the engine 1 and discharges hydraulic oil. The hydraulic control valve unit 10 is supplied with the hydraulic oil by the hydraulic pump 2. Based on the operation of the operation levers 21a and 22a, the hydraulic control valve unit 10 controls the supply of hydraulic oil to the lift cylinder 4 and the tilt cylinder 5 to operate the lift cylinder 4 and the tilt cylinder 5. The operation detection sensors 21b and 22b detect operations of the operation levers 21a and 22a, respectively. The engine ECU 43 controls the engine 1. The valve controller 41 receives detection information from the operation detection sensors 21b and 22b and controls the hydraulic control valve unit 10.

When the operation detection sensor 21b or 22b detects operation of the lift operation lever 21a or 22a and the speed of the engine 1 is less than or equal to the predetermined speed (e.g., the first predetermined speed R1), the valve controller 41 controls the hydraulic control valve unit 10 so that the hydraulic oil is not supplied to the lift cylinder 4 or the tilt cylinder 5 and discharged from the hydraulic control unit 10. In addition, the valve controller 41 instructs the engine ECU 43 to increase the speed. Subsequently, the valve controller 41 operates the unload valve 11 of the hydraulic control valve unit 10 to supply the lift cylinder 4 or the tilt cylinder 5 with the hydraulic oil.

If the speed of the engine 1 is less than or equal to the predetermined speed (first predetermined speed R1) when the operation detection sensor 21b or 22b detects operation of the operation lever 21a or 22a, the supply of hydraulic oil to the lift cylinder 4 or the tilt cylinder 5 is temporarily stopped and the hydraulic oil is discharged. This reduces the load applied to the hydraulic pump 2 and the engine 1 by the hydraulic oil. After the engine ECU 43 receives the instruction for increasing the speed of the engine 1, the lift cylinder 4 or the tilt cylinder 5 is supplied with hydraulic oil. Thus, the load caused by the hydraulic oil for operation of the lift cylinder 4 or the tilt cylinder 5 is applied to the hydraulic pump 2 and the engine 1 that has controlled to increase the speed and produces an increased output. Thus, the hydraulic pump 2 and the engine 1 do not receive the load when the engine 1 is being driven at a low speed (idling speed). This limits reductions in the speed of the engine 1.

When the valve controller 41 determines that at least one of the condition that the predetermined time T1 has elapsed after the instruction to the engine ECU 43 and the condition that the speed of the engine 1 is increased (exceeds the first predetermined speed R1), the valve controller 41 operates the unload valve 11 of the hydraulic control valve unit 10 to supply the lift cylinder 4 or the tilt cylinder 5 with the hydraulic oil. This ensures that the output of the engine 1 has been increased when operating the unload valve 11 to supply the lift cylinder 4 or the tilt cylinder 5 with hydraulic oil.

Further, the hydraulic control valve unit 10 includes the operation valves 21 and 22 and the unload valve 11. The operation valves 21 and 22 are mechanically coupled to the operation levers 21a and 22a and mechanically operated in cooperation with movement of the operation levers 21a and 22a to allow or block supply of the hydraulic oil to the lift cylinder 4 and the tilt cylinder 5, respectively. The unload valve 11 is located between the operation valves 21 and 22 and the hydraulic pump 2. The unload valve 11 switches the hydraulic oil flow so that the hydraulic oil is supplied to the first operation valve 21 and the second operation valve 22 or discharged from the hydraulic control valve unit 10. The valve controller 41 controls the switching of the unload valve 11.

The supply of hydraulic oil to the lift cylinder 4 and the tilt cylinder 5 may be temporarily stopped or started just by the switching operation of the unload valve 11. The unload valve 11 may be located at the inlet of the hydraulic control valve unit 10 or located upstream from the hydraulic control valve unit 10. This simplifies the structure of the hydraulic control valve unit 10 and the unload valve 11. In the forklift 101 of the first embodiment, the unload valve 11 is arranged in the hydraulic control valve unit 10. However, the hydraulic control valve unit 10 and the unload valve 11 may be arranged separately.

Second Embodiment

Instead of the mechanical operation valves 21 and 22 of the forklift 101 of the first embodiment, a forklift (industrial vehicle) 201 of a second embodiment includes electromagnetic valves (solenoid valves) that control supply and discharge of hydraulic oil to and from the lift cylinder 4 and the tilt cylinder 5.

In the second embodiment, same reference numerals are given to those components that are the same as the corresponding components of the first embodiment. Such components will not be described in detail.

Figure 4:
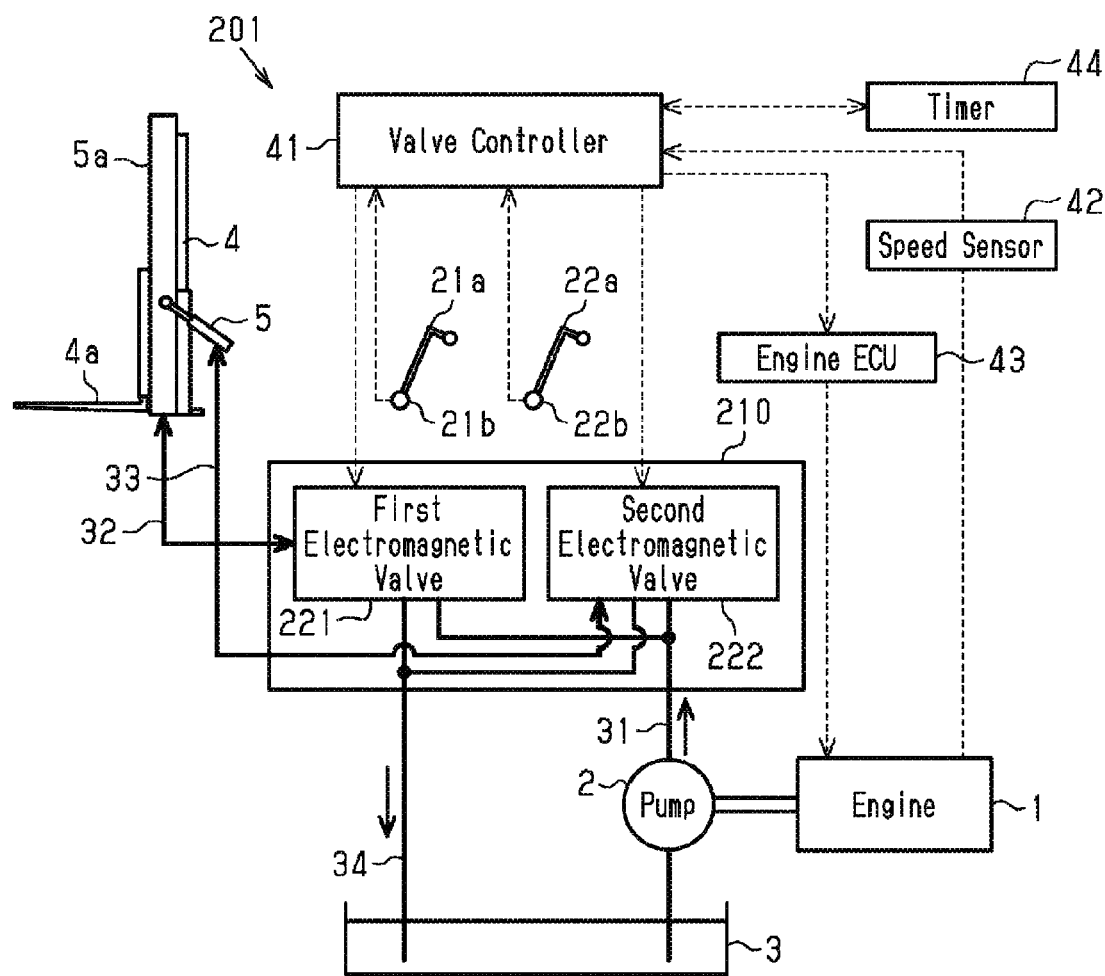
FIG. 4 is a schematic view showing the structure of a second embodiment of an industrial vehicle.

Referring to FIG. 4, in the same manner as the forklift 101 of the first embodiment, the forklift 201 of the second embodiment includes the engine 1, the hydraulic pump 2, the oil tank 3, the lift cylinder 4, the tilt cylinder 5, the valve controller 41, the speed sensor 42, the engine ECU 43, and the timer 44. In addition, the forklift 201 includes a hydraulic control valve unit 210 that differs from the hydraulic control valve unit 10 of the forklift 101 of the first embodiment.

The lift operation lever 21a and the tilt operation lever 22a include the operation detection sensor 21b and the operation detection sensor 22b, respectively. Each of the operation detection sensors 21b and 22b includes a potentiometer, for example. The operation detection sensors 21b and 22b detect the operation amount and direction of the lift operation lever 21a and the tilt operation lever 22a, respectively, based on the neutral positions and send the detection results to the valve controller 41.

The hydraulic pipe 31, which extends from the hydraulic pump 2, is connected to a first electromagnetic valve 221 and a second electromagnetic valve 222 arranged in the hydraulic control valve unit 210. The first and second electromagnetic valves 221 and 222 are electromagnetic switch valves electrically connected to the valve controller 41 so that operation of the electromagnetic valves 221 and 222 is controlled by the valve controller 41. The valve controller 41 controls the first and second electromagnetic valves 221 and 222 based on the states (operation amount and direction) of the lift operation lever 21a and the tilt operation lever 22a that are received from the operation detection sensors 21b and 22b.

The first electromagnetic valve 221 is also connected to the hydraulic pipe 32 and the oil returning pipe 34. The first electromagnetic valve 221 is operable to allow communication between the hydraulic pipe 31 and the lift cylinder 4 and communication between the lift cylinder 4 and the oil returning pipe 34 and adjust the cross-sectional areas of these communication flow passages. Further, the first electromagnetic valve 221 is operable to block the communication between the hydraulic pipe 31 and the lift cylinder 4 and the communication between the lift cylinder 4 and the oil returning pipe 34, allow communication between the hydraulic pipe 31 and the oil returning pipe 34, and adjust the cross-sectional area of this communication flow passage. Thus, the first electromagnetic valve 221 is capable of supply operation, in which the hydraulic oil transferred by the hydraulic pump 2 is supplied to the lift cylinder 4, discharge operation, in which the hydraulic oil is returned to the oil tank 3 from the lift cylinder 4 to reduces the hydraulic pressure, and unload operation, in which supply and discharge of hydraulic oil to and from the lift cylinder 4 is stopped and the hydraulic pipe 31 is in communication with the oil returning pipe 34 under an unload state. In the unload state, the hydraulic pipe 31 and the oil returning pipe 34 are free from hydraulic pressure that applies load to the hydraulic pump 2.

The second electromagnetic valve 222 is also connected to the hydraulic pipe 33 and the oil returning pipe 34. The second electromagnetic valve 222 is operable to allow communication between the hydraulic pipe 31 and the tilt cylinder 5 and communication between the tilt cylinder 5 and the oil returning pipe 34 and adjust the cross-sectional areas of these communication flow passages. In addition, the second electromagnetic valve 222 is operable to block the communication between the hydraulic pipe 31 and the tilt cylinder 5 and the communication between the tilt cylinder 5 and the oil returning pipe 34, allow communication between the hydraulic pipe 31 and the oil returning pipe 34, and adjust the cross-sectional area of this communication flow passage. Thus, the second electromagnetic valve 222 is capable of supply operation, in which the hydraulic oil transferred by the hydraulic pump 2 is supplied to the tilt cylinder 5, discharge operation, in which the hydraulic oil is returned to the oil tank 3 from the tilt cylinder 5, supply and discharge stop operation, in which supply and discharge of hydraulic oil to and from the tilt cylinder 5 is stopped and hydraulic pressure occurs in the hydraulic pipe 31, and unload operation, in which supply and discharge of hydraulic oil to and from the tilt cylinder 5 is stopped and the hydraulic pipe 31 is in communication with the oil returning pipe 34 under an unload state.

Figure 5:
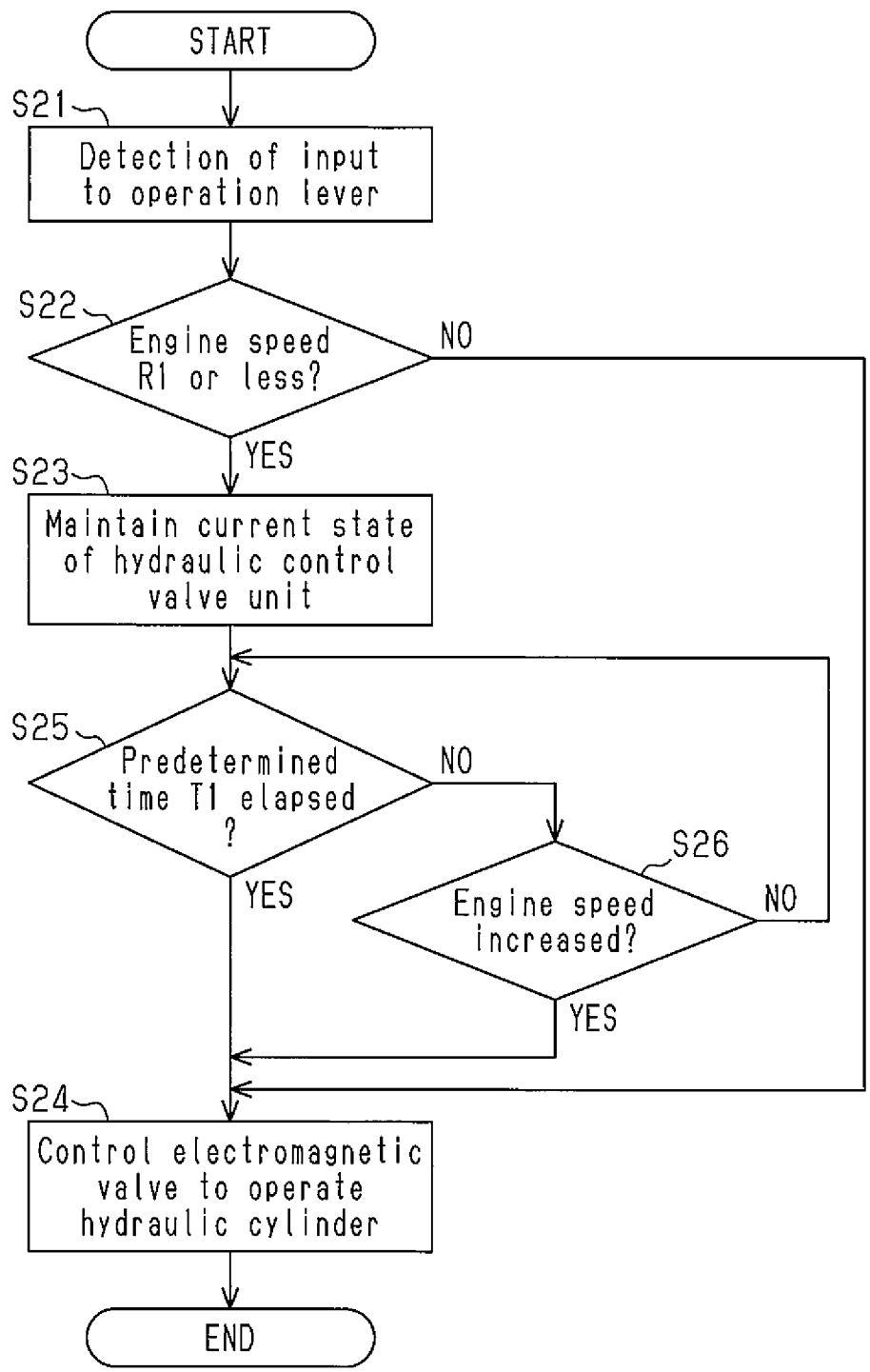
FIG. 5 is a flowchart of the operation of the industrial vehicle of FIG. 4.

Referring to FIG. 4 and the flowchart of FIG. 5, the control of the valve controller 41 will now be described.

In step S21, when the operator of the forklift 201 performs input that applies load to the hydraulic pump 2 to one of the operation levers 21a and 22a in neutral positions, the operation detection sensor 21b or 22b detects the operation amount and direction of the operation lever 21a or 22a and sends the detection information to the valve controller 41.

The input that applies load to the hydraulic pump 2 includes operation of the lift operation lever 21a for lifting the fork 4a and operation of the tilt operation lever 22a for tilting the mast 5a forward and rearward.

In step S22 that follows step S21, the valve controller 41 determines whether or not the speed of the engine 1 that is detected by the speed sensor 42 is the first predetermined speed R1 or less. If the engine speed is the first predetermined speed R1 or less, the valve controller 41 proceeds to step S23. If the engine speed exceeds the first predetermined speed R1, the valve controller 41 proceeds to step S24. When the engine speed is the first predetermined speed R1 or less, the electromagnetic valves 221 and 222 are in the unload operation.

In step S24, in accordance with the operation state of the operation lever 21a or 22a, the valve controller 41 controls the electromagnetic valves 221 and 222 in the hydraulic control valve unit 210 to extend or contract one of the lift cylinder 4 and the tilt cylinder 5 that corresponds to the operation lever 21a or 22a on which operation is detected.

In step S23, the valve controller 41 maintains the state of the electromagnetic valves 221 and 222 that continues from before the input to the operation lever 21a or 22a in the neutral position is detected, that is, the state in which all of the hydraulic oil transferred by the hydraulic pump 2 is returned to the oil tank 3 through the oil returning pipe 34 under the unload state.

Further, when receiving detection information of operation of the operation lever 21a or 22a, the valve controller 41 issues an idle up instruction to the engine ECU 43 to increase the speed of the engine 1 to the second predetermined speed R2. In addition, simultaneously with the issuance of the idle up instruction to the engine ECU 43, the valve controller 41 starts the timer 44 to measure the time elapsed since the start of the timer 44. The valve controller 41 continuously monitors the elapsed time measured by the timer 44 and the speed information of the engine 1 that is detected by the speed sensor 42.

In step S25 that follows step S23, the valve controller 41 determines whether or not the elapsed time measured by the timer 44 has reached the predetermined time T1. If the elapsed time has reached the predetermined time T1, the valve controller 41 proceeds to step S24. If the elapsed time has not reached the predetermined time T1, the valve controller 41 proceeds to step S26.

In step S26, the valve controller 41 determines whether or not the engine speed detected by the speed sensor 42 is increased to a value that is higher than the first predetermined speed R1, for example. If the engine speed is the first predetermined speed R1 or less, the valve controller 41 returns to step S25. If the engine speed exceeds the first predetermined speed R1, the valve controller 41 proceeds to step S24.

As described above, when detecting operation of the operation lever 21a or 22a in the neutral position while the engine speed is the first predetermined speed R1 or less, the valve controller 41 maintains the unload state of the hydraulic control valve unit 210 and issues an instruction to idle up the engine 1. Subsequently, when the condition that the predetermined time T1 has elapsed or the condition that the speed of the engine 1 is detected to be increased is satisfied, the valve controller 41 operates the hydraulic control valve unit 210 to extend the lift cylinder 4 or extend or contract the tilt cylinder 5 in accordance with the input to the operation lever 21a or 22a.

The other structures and operations of the forklift 201 of the second embodiment are the same as those of the first embodiment.

The forklift 201 of the second embodiment has the same advantages as the forklift 101 of the first embodiment.

In addition, the hydraulic control valve unit 210 of the forklift 201 includes the electromagnetic valves 221 and 222 that switch the hydraulic oil flow so that the hydraulic oil received from the hydraulic pump 2 is supplied to and discharged from the lift cylinder 4 or the tilt cylinder 5 based on the operation of the operation lever 21a or 22a detected by the operation detection sensor 21b or 22b. The valve controller 41 controls the switching of the electromagnetic valves 221 and 222. When extension of the lift cylinder 4 or extension or contraction of the tilt cylinder 5 is performed while the engine speed is low, the valve controller 41 controls the switching timing of the conventional electromagnetic valves 221 and 222 to prevent reduction in the engine speed. This eliminates the need for an additional device, thereby reducing the size of the hydraulic control valve unit 210 and the costs.

It should be apparent to those skilled in the art that the present invention may be embodied in many other specific forms without departing from the spirit or scope of the invention. Particularly, it should be understood that the present invention may be embodied in the following forms.

In the second embodiment, upon detecting an input to one of the operation levers 21a and 22a in the neutral positions, the valve controller 41 temporary maintains the unload state of the hydraulic control valve unit 210. Then, when the predetermined condition is satisfied, the valve controller 41 operates the hydraulic control valve unit 210 to extend or contract the lift cylinder 4 or the tilt cylinder 5. However, the present invention is not limited to such a structure.

For example, upon detecting an input to one of the operation levers 21a and 22a in the neutral positions, the valve controller 41 may operate the electromagnetic valve 221 or 222 to communicate the hydraulic pipe 31 and the lift cylinder 4 or the tilt cylinder 5 and gradually increase the cross-sectional area of the communication flow passage from null. This gradually increases the flow rate of the hydraulic oil for operation of the lift cylinder 4 or the tilt cylinder 5 from null. Even though the load on the hydraulic pump 2 and the engine 1 caused by the hydraulic oil gradually increases from null, the speed of the engine 1 increases simultaneously. This limits reduction in the speed of the engine 1.

In the above embodiments, the first predetermined speed R1 is the idling engine speed. However, the present invention is not limited to such a structure. The first predetermined speed R1 may be any value that is set based on the possibility that when a hydraulic cylinder (lift cylinder 4 or tilt cylinder 5) is operated while the engine speed is the first predetermined speed R1 or less, reduction in the engine speed caused by the load on the hydraulic pump 2 may destabilize the engine behavior and cause knocking, deteriorate the exhaust gas components, or stall the engine.

In the first and second embodiments, the first predetermined speed R1 (idling speed) is the predetermined speed that is used as the reference to determine whether or not the engine speed is increased. However, the predetermined speed may be any speed that allows detection of increase in the engine speed. Thus, the predetermined speed may differ from the first predetermined speed R1.

In the first and second embodiments, the determination whether the engine speed is increased is performed after the determination whether the predetermined time T1 has elapsed. However, at least one of the determinations may be performed. Further, the determination whether the predetermined time T1 has elapsed may be performed after the determination whether the engine speed is increased.

The hydraulic mechanism is not limited to a lift cylinder and a tilt cylinder and may be hydraulic cylinders for other operations. For example, the hydraulic mechanism may be a hydraulic cylinder to move an attachment of the forklift. Further, the hydraulic mechanism may be used for a hydraulic power steering device.

Figure 6:
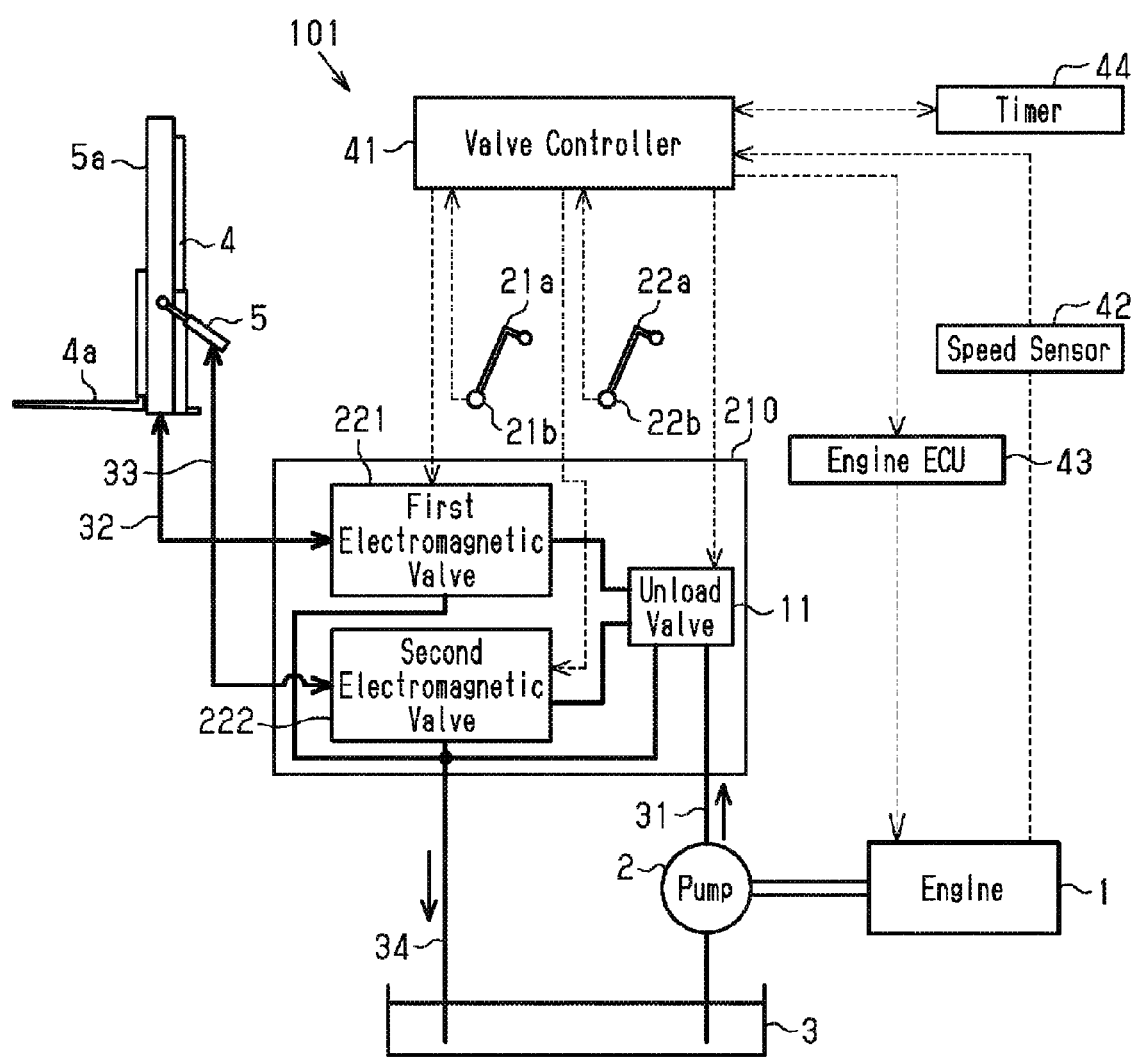
FIG. 6 is a schematic view showing the structure of another embodiment of an industrial vehicle.

In the second embodiment, the hydraulic control valve unit 210 includes the electromagnetic valves 221 and 222 and does not include an unload valve. However, as shown in FIG. 6, an unload valve 11 may be included. In this case, the unload valve 11 is arranged between the electromagnetic valves 221 and 222 and the hydraulic pump 2, and the electromagnetic valves 221 and 222 are controlled to provide the hydraulic oil flow in the same manner as the mechanical valves 21, 22 of the first embodiment.

The industrial vehicle is not limited to a forklift. The industrial vehicle may be any vehicle that includes a hydraulic mechanism powered by an engine-driven hydraulic pump. For example, the industrial vehicle may be construction equipment, such as a backhoe and an excavator, or a service vehicle such as an aerial work platform truck.

The present examples and embodiments are to be considered as illustrative and not restrictive and the invention is not to be limited to the details given herein, but may be modified within the scope and equivalence of the appended claims.

The invention claimed is:

1. An industrial vehicle driven by an internal combustion engine, the industrial vehicle comprising:
   a hydraulic mechanism that is configured to be hydraulically actuated;
   a pump driven by the internal combustion engine to supply hydraulic oil to the hydraulic mechanism from an oil tank;
   a hydraulic control valve unit that receives the hydraulic oil from the pump and is configured to control supply of the hydraulic oil to the hydraulic mechanism and to discharge the hydraulic oil back to the oil tank;
   an operation lever that operates the hydraulic control valve unit, the operation lever having a neutral position for causing the hydraulic control valve unit to stop the supply of the hydraulic oil to the hydraulic mechanism and the discharge of the hydraulic oil from the hydraulic mechanism;
   a lever operation detector configured to detect the operation of the operation lever;
   an internal combustion engine controller configured to control the internal combustion engine; and
   a valve controller configured to:
   receive detection information from the lever operation detector that the operation lever is operated from the neutral position;
   determine whether a detected speed of the internal combustion engine is less than or equal to a predetermined speed;

wherein, when the lever operation detector detects the operation of the operation lever from the neutral position while the speed of the internal combustion engine is less than or equal to the predetermined speed, the valve controller is configured to (i) control the hydraulic control valve unit to discharge the hydraulic oil, which is supplied to the hydraulic control valve unit from the pump, back to the oil tank without supplying the hydraulic oil to the hydraulic mechanism and (ii) instruct the internal combustion engine controller to increase the speed of the internal combustion engine, and (iii) determine whether a predetermined time has elapsed and whether the speed of the internal combustion engine has increased to be more than the predetermined speed, and (iv) subsequently control the hydraulic control valve unit to supply the hydraulic oil to the hydraulic mechanism based upon a determination that at least one of the following conditions is satisfied after the internal combustion engine controller is instructed to increase the speed of the internal combustion engine: (a) the predetermined time has elapsed and (b) the speed of the internal combustion engine has increased to be more than the predetermined speed.

2. The industrial vehicle according to claim 1, wherein the hydraulic control valve unit includes:

an operation valve mechanically coupled to the operation lever, wherein the operation valve is mechanically operated in cooperation with movement of the operation lever, and wherein the operation valve is configured to allow or block the supply of the hydraulic oil to the hydraulic mechanism and to discharge hydraulic fluid back to the oil tank; and an unload valve arranged between the operation valve and the pump, wherein the unload valve switches flow of the hydraulic oil so that the hydraulic oil is supplied to the operation valve or discharged from the hydraulic control valve unit to the oil tank, and the valve controller is configured to control switching of the unload valve.

3. The industrial vehicle according to claim 1, wherein the hydraulic control valve unit includes an electromagnetic valve configured to switch flow of the hydraulic oil so that the hydraulic oil is supplied to the electromagnetic valve or discharged from the hydraulic control valve unit based on the operation of the operation lever detected by the lever operation detector, the valve controller is configured to control switching of the electromagnetic valve, and the valve controller is configured to control the electromagnetic valve to temporarily discharge the hydraulic oil to the oil tank when instructing the internal combustion engine controller to increase the speed of the internal combustion engine.

4. The industrial vehicle according to claim 1, wherein the hydraulic control valve unit includes:

an electromagnetic valve configured to switch flow of the hydraulic oil so that the hydraulic oil is supplied to the hydraulic mechanism or discharged from the hydraulic control valve unit based on the operation of the operation lever detected by the lever operation detector; and an unload valve arranged between the electromagnetic valve and the pump, wherein the unload valve switches flow of the hydraulic oil so that the hydraulic oil is supplied to the electromagnetic valve or discharged from the hydraulic control valve unit to the oil tank, and the valve controller is configured to control switching of the unload valve.

5. A method for controlling an industrial vehicle that is driven by an internal combustion engine and includes a hydraulic mechanism that is configured to be hydraulically actuated, a pump driven by the internal combustion engine to supply hydraulic oil to the hydraulic mechanism from an oil tank, a hydraulic control valve unit that receives the hydraulic oil from the pump and is configured to control supply of the hydraulic oil to the hydraulic mechanism and to discharge the hydraulic oil back to the oil tank, an operation lever that operates the hydraulic control valve unit, the operation lever having a neutral position for causing the hydraulic control valve unit to stop the supply of the hydraulic oil to the hydraulic mechanism and the discharge of the hydraulic oil from the hydraulic mechanism, and a lever operation detector configured to detect the control of the operation lever, the method comprising:

controlling the internal combustion engine with an internal combustion engine controller;

when the lever operation detector detects the control of the operation lever from the neutral position while a speed of the internal combustion engine is less than or equal to a predetermined speed, controlling the hydraulic control valve unit to discharge the hydraulic oil, which is supplied to the hydraulic control valve unit from the pump, back to the oil tank without supplying the hydraulic oil to the hydraulic mechanism and instructing the internal combustion engine controller to increase the speed of the internal combustion engine;

after controlling the hydraulic control valve unit to discharge the hydraulic oil back to the oil tank without supplying the hydraulic oil to the hydraulic mechanism and instructing the internal combustion engine controller to increase the speed of the internal combustion engine, determining whether a predetermined time has elapsed and whether the speed of the internal combustion engine has increased to be more than the predetermined speed; and controlling the hydraulic control valve unit to supply the hydraulic oil to the hydraulic mechanism based upon determining that at least one of the following conditions is satisfied: (a) the predetermined time has elapsed and (b) the speed of the internal combustion engine has increased to be more than the predetermined speed.

* * * * *